United States Patent
Peri et al.

(10) Patent No.: US 7,802,668 B2
(45) Date of Patent: Sep. 28, 2010

(54) STATOR SIDE PLATE FOR A TORQUE CONVERTER

(75) Inventors: Patanjali Peri, Wooster, OH (US); Steve Caskey, North Lawrence, OH (US); Christopher Shamie, Wadsworth, OH (US); Steven Olsen, Wooster, OH (US); Ramakant Rambhatla, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 448 days.

(21) Appl. No.: 11/641,495

(22) Filed: Dec. 19, 2006

(65) Prior Publication Data
US 2007/0137977 A1  Jun. 21, 2007

Related U.S. Application Data

(60) Provisional application No. 60/751,514, filed on Dec. 19, 2005.

(51) Int. Cl.
*F16D 11/00* (2006.01)
*F16D 13/60* (2006.01)

(52) U.S. Cl. .............................. 192/110 B; 192/110 R

(58) Field of Classification Search .............. 192/110 R, 192/110 B
See application file for complete search history.

(56) References Cited

U.S. PATENT DOCUMENTS

| 5,125,487 | A | * | 6/1992 | Hodge ........................ 192/3.34 |
| 5,632,363 | A | * | 5/1997 | Kubo et al. ................. 192/45.1 |
| 6,223,872 | B1 | | 5/2001 | Heller et al. |
| 6,354,413 | B2 | | 3/2002 | Heller et al. |
| 6,814,203 | B2 | | 11/2004 | Kamiya et al. |
| 6,902,046 | B1 | * | 6/2005 | Dumas ....................... 192/41 A |
| 6,933,641 | B2 | * | 8/2005 | Muramatsu et al. ........... 310/90 |
| 7,318,676 | B2 | * | 1/2008 | Fugel et al. .................. 384/620 |
| 2003/0226732 | A1 | | 12/2003 | Kamiya et al. |
| 2004/0076522 | A1 | | 4/2004 | Ochi et al. |
| 2004/0216972 | A1 | | 11/2004 | Tomiyama |
| 2006/0024161 | A1 | * | 2/2006 | Ackermann .............. 415/208.1 |

FOREIGN PATENT DOCUMENTS

| DE | 19702752 | | 7/1998 |
| DE | 10126286 | | 12/2002 |
| EP | 0549824 A1 | | 7/1993 |
| EP | 0845693 A1 | | 6/1998 |
| GB | 2335256 A | * | 9/1999 |

* cited by examiner

*Primary Examiner*—Tisha D Lewis
(74) *Attorney, Agent, or Firm*—Simpson & Simpson, PLLC

(57) ABSTRACT

The present invention broadly comprises a stamped side plate for a torque converter stator, including: an annular segment having an inner circumferential surface and a top surface and at least one protrusion extending radially inward beyond the inner circumferential surface. The at least one protrusion comprises a race retaining surface substantially parallel to the top surface. The inner circumferential surface and the race retaining surface are arranged to center and retain an inner race for the stator, respectively. The annular segment also includes at least one annular protrusion extending from the top surface and including a centering surface substantially orthogonal to the top surface. The centering surface is arranged to center a bearing for the stator. The at least one annular protrusion is proximate the inner circumferential surface or an outer edge for the annular segment.

17 Claims, 8 Drawing Sheets

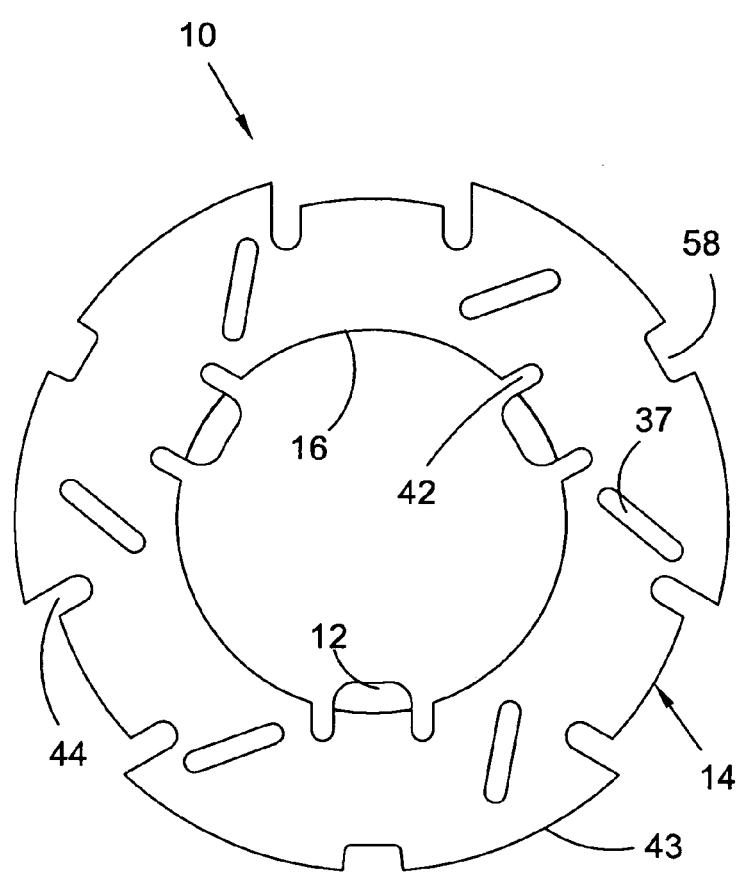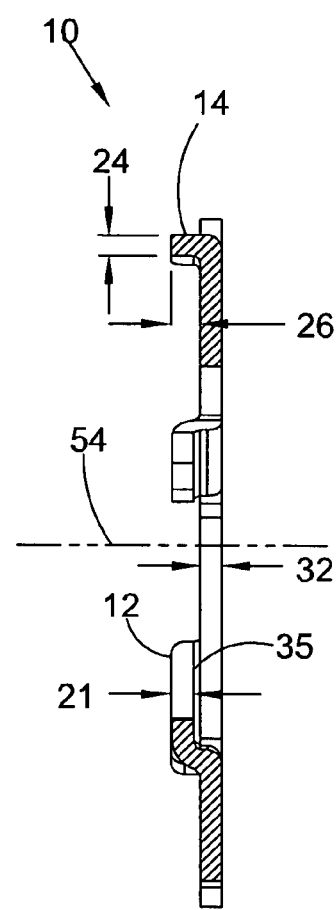
Fig. 2
Fig. 3

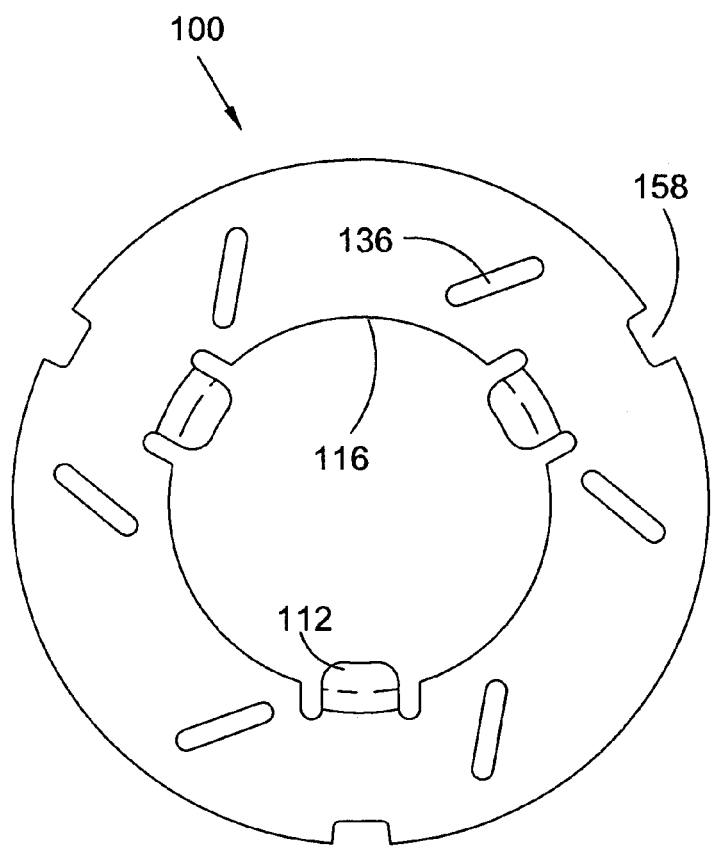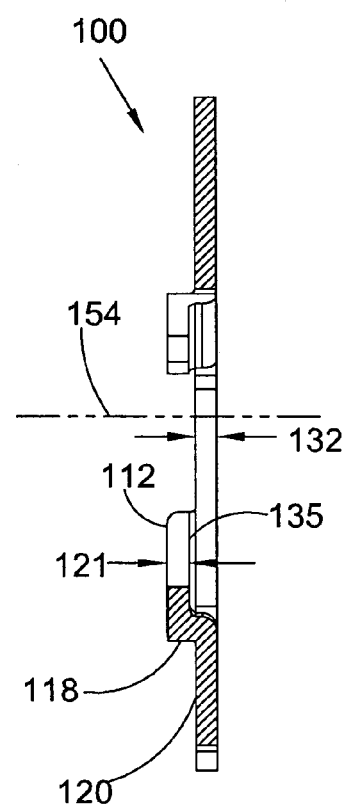
Fig. 7
Fig. 8

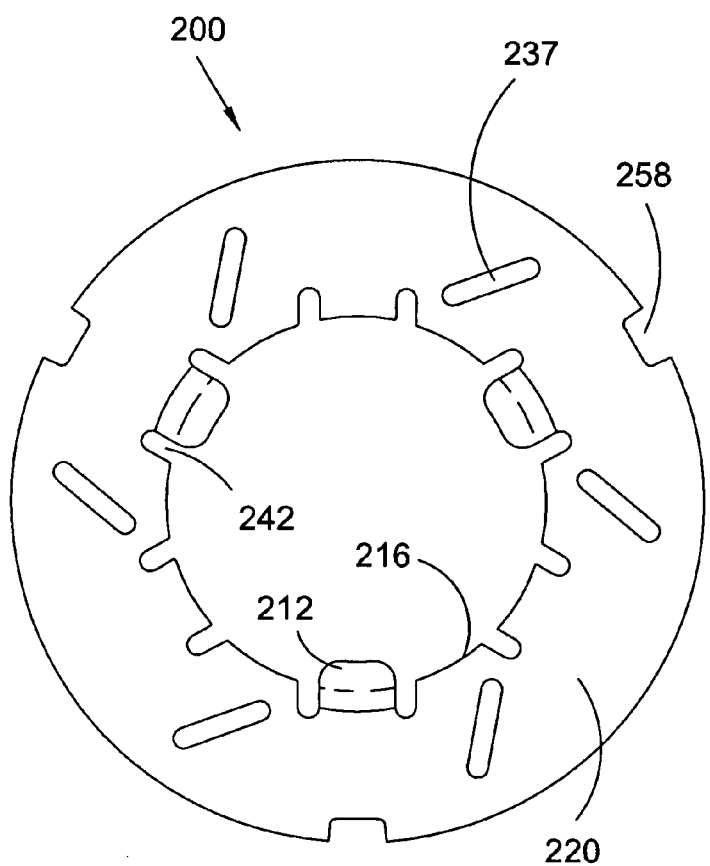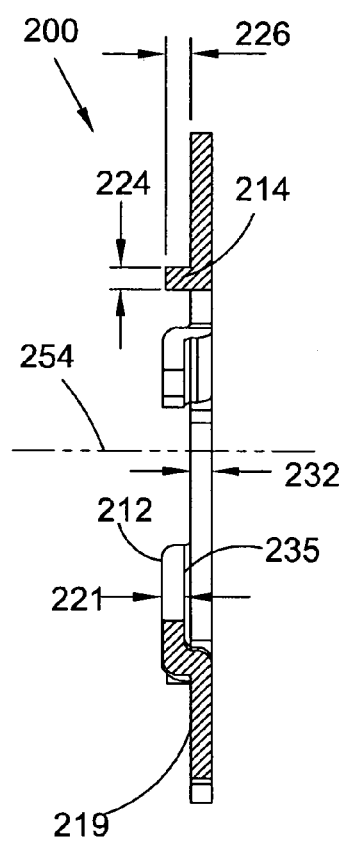
Fig. 10
Fig. 11

STATOR SIDE PLATE FOR A TORQUE CONVERTER

CROSS-REFERENCE TO RELATED APPLICATIONS

This application claims the benefit under 35 U.S.C. §119 (e) of U.S. Provisional Application No. 60/751,514, filed Dec. 19, 2005.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a stamped side plate for the stator of a torque converter.

BACKGROUND OF THE INVENTION

Side plates are used in stators for torque converters to center and retain an inner race for the stator and to center a bearing for the stator. It is known to use machined or cast parts for the side plates. Unfortunately, machining is relatively slow and costly and results in significant scrap material. Casting also is relatively costly. In some cases, ancillary parts, such as snap rings also are necessary. Unfortunately, the use of ancillary parts increases the cost and complexity of installing a side plate in a stator.

Thus, there is a long-felt need for a stator side plate that can be quickly and inexpensively manufactured and installed in the stator.

BRIEF SUMMARY OF THE INVENTION

The present invention broadly comprises a stamped side plate for a torque converter stator, including: an annular segment having an inner circumferential surface and a top surface and at least one protrusion extending radially inward beyond the inner circumferential surface. The at least one protrusion comprises a race retaining surface substantially parallel to the top surface. In some aspects, the race retaining surface is non-coplanar with the top surface. In some aspects, the stator comprises an inner race, the inner circumferential surface is arranged to center the inner race, and the race retaining surface is arranged to retain the inner race in the stator.

The annular segment also includes at least one annular protrusion extending from the top surface and including a centering surface substantially orthogonal to the top surface. In some aspects, the stator comprises a bearing and the centering surface is arranged to center the bearing. In some aspects, the annular segment comprises an outer edge and the at least one annular protrusion is proximate the inner circumferential surface or the outer edge. In some aspects, the at least one protrusion includes the at least one annular protrusion.

In some aspects, the annular segment further comprises at least one slot. The slot is fully surrounded by the annular segment or the slot is in communication with an inner or an outer edge of the annular segment. In some aspects the at least one slot crosses a plane formed by the inner or outer circumference for a bearing in the stator.

The present invention also broadly includes a side plate for a torque converter stator, including: an annular segment having a top surface and at least one annular protrusion extending from the top surface. The side plate is stamped. In some aspects, the at least one annular protrusion further includes a surface substantially orthogonal to the top surface or the annular segment further includes an inner circumference and the at least one annular protrusion is proximate the inner circumference. In some aspects, the annular segment includes an outer circumference and the at least one annular protrusion is proximate the outer circumference or the stator includes a bearing and the surface is arranged to center the bearing. In some aspects, the annular segment includes an inner circumferential surface and at least one protrusion extending radially inward beyond the inner circumferential surface, and the at least one protrusion includes a race retaining surface substantially parallel to the top surface and non-coplanar with the top surface. Then, the stator includes an inner race and the inner circumferential surface and the race retaining surface are arranged to center and retain the inner race, respectively.

In some aspects, the at least one annular protrusion includes the at least one protrusion or the annular segment further includes at least one slot. In some aspects, the at least one slot is fully defined by the annular segment, the annular segment further includes an inner edge and an outer edge and the at least one slot is in communication with the inner edge or the outer edge, or the stator includes a bearing with an inner circumference and an outer circumference and the at least one slot crosses a respective plane formed by the inner or outer circumference for the bearing.

The present invention further broadly includes a side plate for a torque converter stator, including: an annular segment having an inner circumferential surface and a top surface; at least one protrusion extending radially inward beyond the inner circumferential surface, where the at least one protrusion includes a race retaining surface substantially parallel to the top surface and the inner circumferential surface and the race retaining surface are arranged to center and retain, respectively, an inner race for the stator; at least one annular protrusion, separate from the at least one protrusion, extending from the top surface, proximate an outer edge for the annular segment, and arranged to center a bearing for the stator; and at least one slot in the annular segment. A bearing for the stator includes an inner circumference and an outer circumference, and the at least one slot crosses a respective plane formed by the inner or the outer circumference.

The present invention broadly comprises a method for engaging an inner race and a bearing for a stator in a torque converter, including the steps of: stamping the plate to form at least one first, second, and third surfaces, respectively, and at least one slot; retaining the inner race in the stator with the at least one first surface; centering the inner race with the at least one second surface; centering the bearing with the at least one third surface; and providing oil flow through the side plate with the at least one slot.

It is a general object of the present invention to provide a stamped side plate for a stator in a torque converter, thereby reducing the costs associated with manufacturing a side plate for the stator.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 2 is a bottom view of the side plate shown in FIG. 1;

FIG. 3 is a cross-sectional view of the side plate shown in FIG. 1 along line 3-3 in FIG. 1;

FIG. 7 is a bottom view of the side plate shown in FIG. 6;

FIG. 8 is a cross-sectional view of the side plate shown in FIG. 6 along line 8-8 in FIG. 6;

FIG. 10 is a bottom view of the side plate shown in FIG. 9; and,

FIG. 11 is a cross-sectional view of the side plate shown in FIG. 9 along line 11-11 in FIG. 9.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
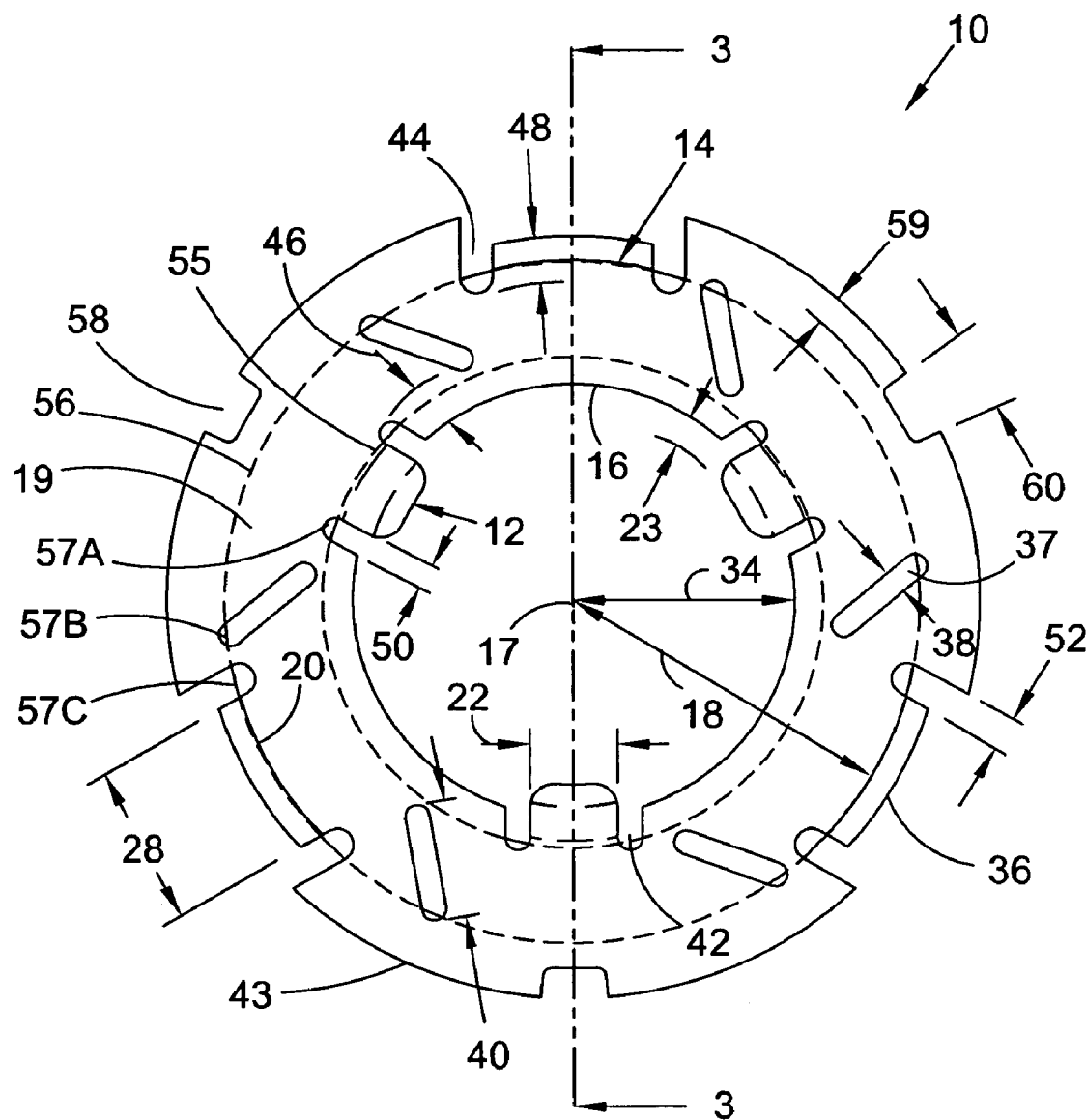
FIG. 1 is a top view of a first present invention side plate for a stator.

FIG. 1 is a top view of present invention stamped side plate 10 for a stator.

FIG. 2 is a bottom view of side plate 10 shown in FIG. 1.

FIG. 3 is a cross-sectional view of side plate 10 shown in FIG. 1 along line 3-3 in FIG. 1. The following should be viewed in light of FIGS. 1-3. Side plate 10 includes at least one protrusion 12, at least one annular protrusion 14, and an inner circumferential surface 16. Protrusions 12 extend radially inward beyond surface 16. In some aspects, protrusions 12 are in the form of tabs 12. Tabs 12 are used in the descriptions that follow, however, it should be understood that any type of protrusion, such as fingers, can be used for protrusions 12 and such protrusions are included in the spirit and scope of the invention as claimed.

By annular protrusion, we mean that protrusions 14 form at least a portion of a ring about center 17 for plate 10. Alternately stated, protrusions 14 are a uniform radial distance 18 from center 17. In some aspects, protrusions 14 are in the form of tabs 14. Tabs 14 are used in the descriptions that follow, however, it should be understood that any type of protrusion, such as fingers, can be used for protrusions 14 and such protrusions are included in the spirit and scope of the invention as claimed. Tabs 14 extend from top surface 19 of plate 10. In some aspects, centering surfaces 20 of tabs 14 are substantially orthogonal to surface 19.

It should be understood that plate 10 is not limited to the number, size, shape, and configuration of tabs 12 and 14 shown and that other numbers, sizes, shapes, and configurations of tabs 12 and 14 are included within the spirit and scope of the invention as claimed. For example, plate 10 can include more or less than 3 respective tabs 12 or 14. Regarding tabs 12, thickness 21, width 22, and radial dimension 23 with respect to surface 16, can be selected according to the particular application in which plate 10 is installed. In like manner, for tabs 14, thickness 24, height 26, width 28, and radial dimension 18 can be selected according to the particular application in which plate 10 is installed. Plate 10 is not limited to a particular thickness 32 or radius 34. The thickness and radius can be selected according to the particular application in which plate 10 is installed. In general, the number of respective tabs and the dimensions of tabs 12 and 14 and surface 16 can be selected to provide the retaining and centering capability, described infra, required for a particular application, while accounting for the particular parameters, tolerances, and characteristics regarding the stator, inner race, bearing, and materials of construction associated with the application.

Tabs 12 include race retaining surfaces 35. In some aspects, surfaces 35 are substantially parallel to top surface 19. In FIGS. 1-3, surfaces 35 are non-coplanar with surface 19. In some aspects (not shown), surfaces 19 and 35 are co-planar. In some aspects, tabs 14 are proximate outer edge 36. In some aspects, tabs 14 form a portion of outer edge 36. For example, if plate 10 is stamped, tabs 14 can be formed from a periphery (not shown) of the stock material forming plate 10. Tabs 12, specifically surfaces 35 retain an inner race (shown infra) for a stator (shown infra) into which plate 10 is installed. Surface 16 centers the inner race. Tabs 14, specifically, surfaces 20, center a bearing (shown infra) for the preceding stator.

In some aspects, plate 10 includes slots, which provide oil flow to the bearing and oil flow through the plate. Plate 10 is not limited to any particular number, shape, size, or configuration of slots. In some aspects, slots 37 are fully surrounded, or defined by, plate 10 and surface 19. In these cases, slots 37 are not limited to a particular width 38 or length 40. In some aspects, the slots are in communication with surface 16 (slots 42) or outer edge 36 or 43 (slots 44). That is, the respective slots open into the respective surface or edges. Plate 10 is not limited to any particular number, shape, size, or configuration of slots 37, 42 or 44. For example, slots 42 and 44 are not limited to a particular respective length 46 or 48 or respective width 50 or 52, or to a particular radial angle with respect to longitudinal axis 54 of plate 10. Plate 10 can include any combination of slots 37, 42, and 44.

In some aspects, slots 37, 42, or 44 cross the respective planes formed by an inner or outer circumference for a bearing (not shown) engaged with plate 10, in particular, engaging surfaces 19 and 20. The planes are orthogonal to surface 19. Dashed lines 55 and 56 show possible intersections of the aforementioned planes with surface 19. In some aspects, slots 37, 42, and 44 cross lines 55 or 56 at areas 57A, 57B, and 57C, respectively. Due to these crossings, oil flowing through the slots is able to both lubricate the bearing and flow past the bearing. For example, at area 57B, a portion of slot 37 is between the inner and outer circumference of the bearing (enabling oil flow to the bearing) and a portion of slot 37 is outside line 56, with respect to center 17, (enabling oil flow past the bearing).

In some aspects, plate 10 also includes slots 58. These slots are configured to engage the stator (not shown), rotationally locking the plate and the stator. Plate 10 is not limited to any particular number, shape, size, or configuration of slots 58. For example, slots 58 are not limited to a particular length 59 or width 60. Slots 58 can be configured to accommodate the particular stator in which plate 10 is to be installed.

In some aspects, plate 10 is machined, cast, or molded. In some aspects, plate 10 is stamped. Plate 10 can be made of any material known in the art. For example, a stamped plate 10 can be made from steel or aluminum. In those aspects in which plate 10 is stamped, thickness 32 can be made smaller than for machined, cast, or molded plates. A reduction in thickness 32 advantageously reduces the axial space occupied by the stator containing plate 10.

Figure 4:
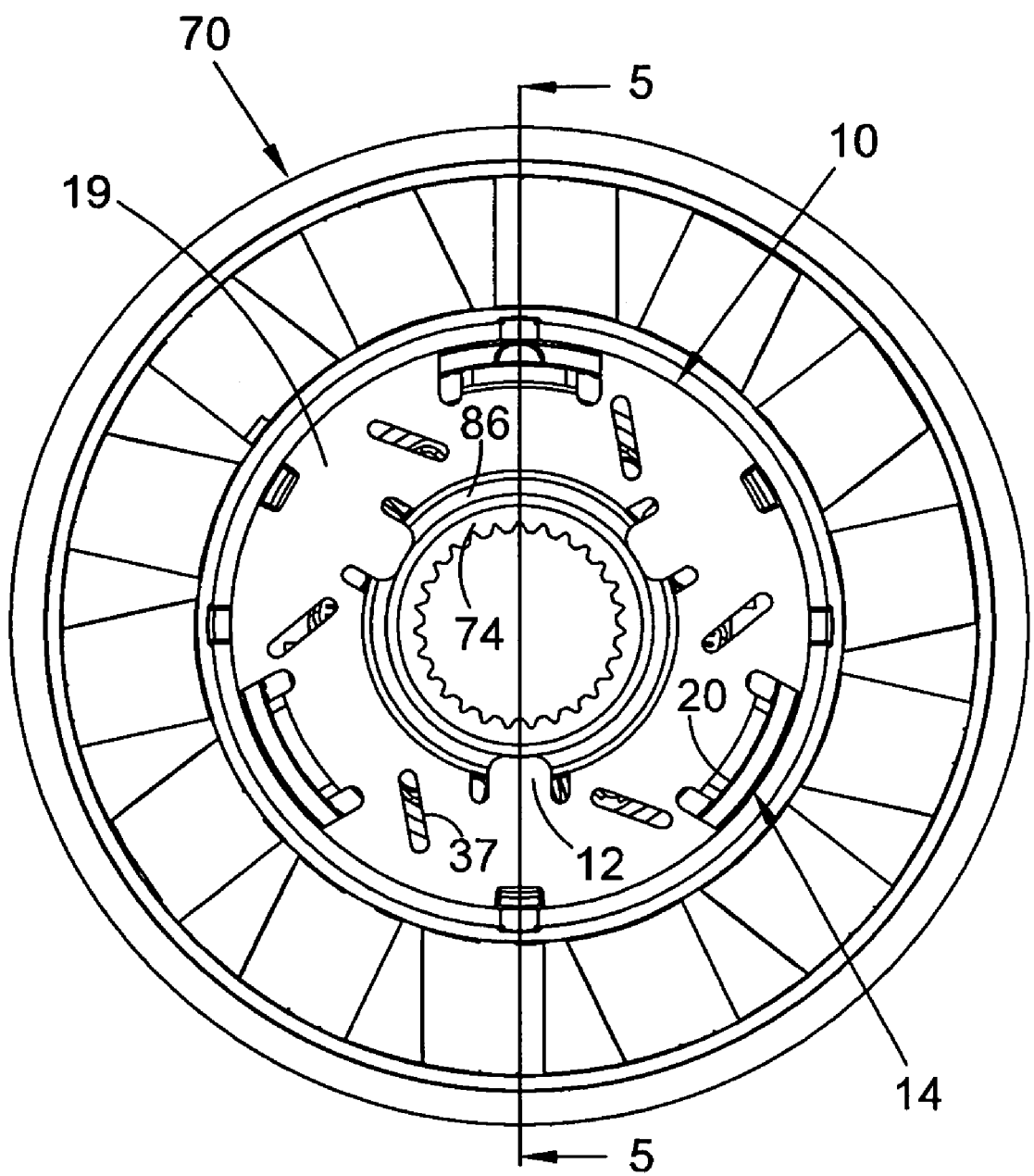
FIG. 4 is a top view of a stator with a present invention side plate installed.

FIG. 4 is a top view of stator 70 with present invention side plate 10 installed.

Figure 5:
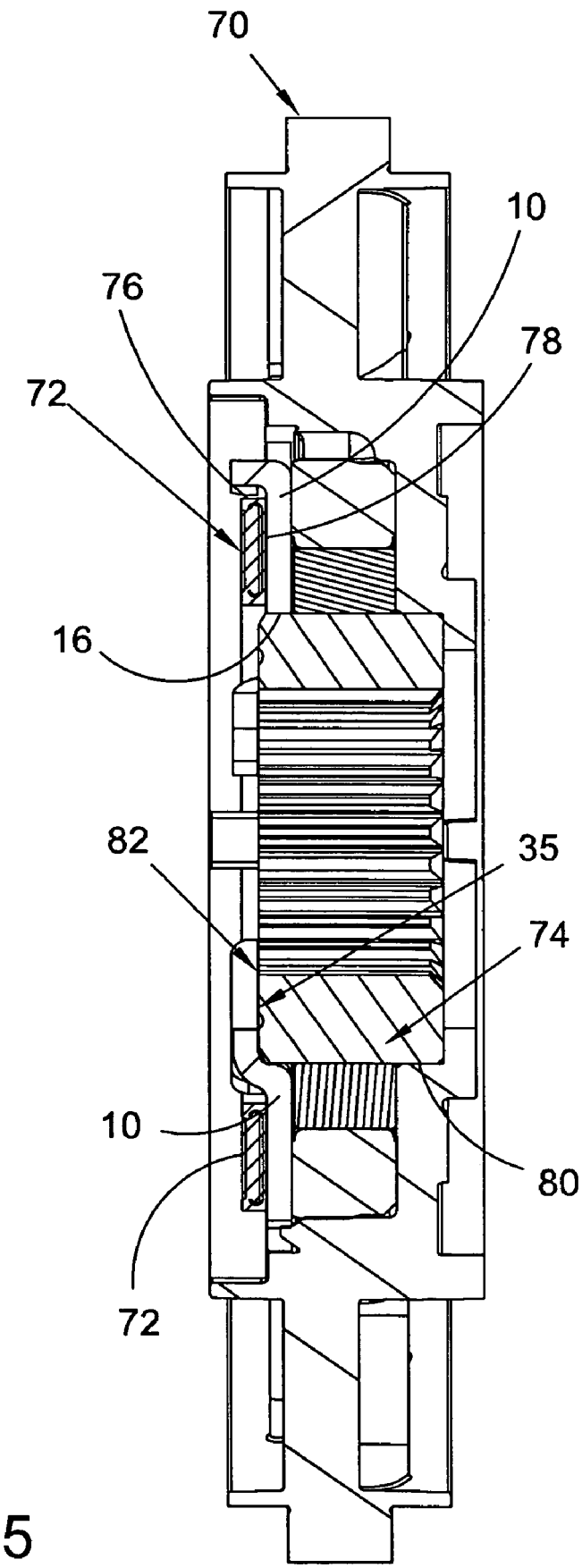
FIG. 5 is a cross-sectional view of the stator shown in FIG. 4 along line 5-5 in FIG. 4, with a bearing added.

FIG. 5 is a cross-sectional view of stator 70 shown in FIG. 4 along line 5-5 in FIG. 4, with bearing 72 added. The following should be viewed in light of FIGS. 1 through 5. In FIG. 4, bearing 72 is not shown, in order to more fully show plate 10. In FIG. 5, bearing 72 has been added to provide further detail regarding plate 10 and the configuration of plate 10 with respect to stator 70, specifically, with respect to bearing 72 and inner race 74. Outer circumference 76 of bearing 72 is in at least intermittent contact with surface 20 of tabs 14 to center the bearing. Face 78 of bearing 72 is in contact with surface 19 of plate 10. Outer circumference 80 of inner race 74 is in at least intermittent contact with surface 16. Face 82 of the inner race is in at least intermittent contact with surface 35 of tabs 12. It should be understood that a present invention side plate is not limited to use with the stator shown in FIGS. 4 and 5 and that the use of a present invention side plate with other stators is included in the spirit and scope of the invention as claimed.

Figure 6:
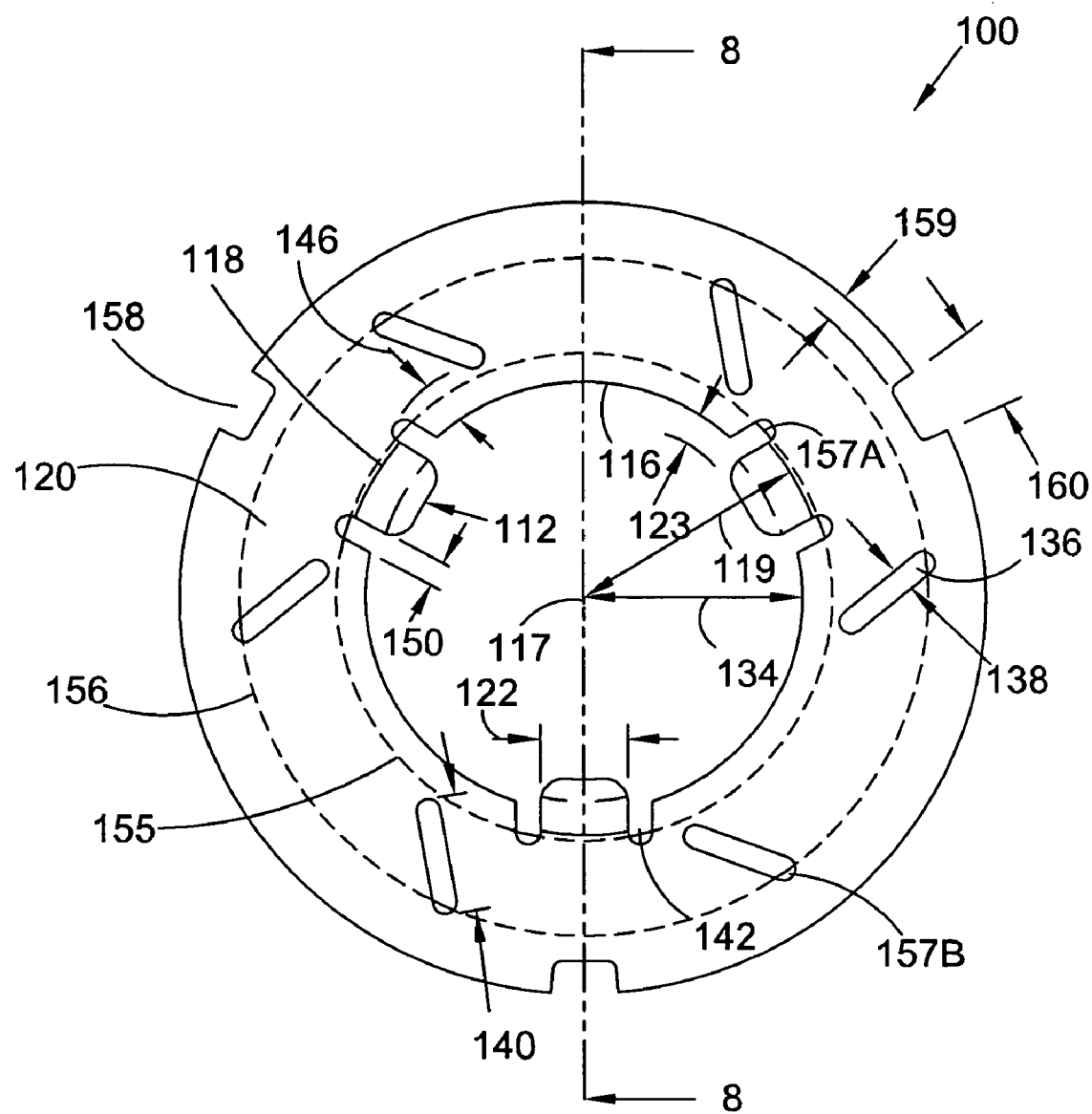
FIG. 6 is a top view of a second present invention side plate for a stator.

FIG. 6 is a top view of present invention side plate 100 for a stator.

FIG. 7 is a bottom view of side plate 100 shown in FIG. 6.

FIG. 8 is a cross-sectional view of side plate 100 shown in FIG. 6 along line 8-8 in FIG. 6. The following should be viewed in light of FIGS. 6-8. Side plate 100 includes at least one protrusion 112 and an inner circumferential surface 116. Protrusions 112 extend radially inward beyond surface 116. In some aspects, protrusions 112 are in the form of tabs 112. Tabs 112 are used in the descriptions that follow, however, it should be understood that any type of protrusion, such as fingers, can be used for protrusions 112 and such protrusions are included in the spirit and scope of the invention as claimed.

Tabs 112 also form annular protrusions, by this we mean that protrusions 112 form at least a portion of a ring about center 117 for plate 100. In particular, surfaces 118 define the annular protrusion. Surfaces 118 are a uniform radial distance 119 from center 117 and in some aspects, are substantially orthogonal to surface 120. Thus, referring to FIGS. 1-6, in contrast to plate 10, which has separate tabs 12 and 14, tabs 112 of plate 100 incorporate the functionality shown for tabs 12 and 14.

It should be understood that plate 100 is not limited to the number, size, shape, and configuration of tabs 112 shown and that other numbers, sizes, shapes, and configurations of tabs 112 are included within the spirit and scope of the invention as claimed. For example, plate 100 can include more or less than 3 tabs 112. Regarding tabs 112, thickness 121, width 122, radial dimension 119, and dimension 123 can be selected according to the particular application in which plate 100 is installed. Plate 100 is not limited to a particular thickness 132 or radius 134. The thickness and radius can be selected according to the particular application in which plate 100 is installed. In general, the number of respective tabs and the dimensions of tabs 112 and surface 116 can be selected to provide the retaining and centering capability, described infra, required for a particular application, while accounting for the particular parameters, tolerances, and characteristics regarding the stator, inner race, bearing, and materials of construction associated with the application.

Tabs 112 include race retaining surfaces 135. In some aspects, surfaces 135 are substantially parallel to top surface 120. In FIGS. 6-8, surfaces 135 are non-coplanar with surface 120. In some aspects (not shown), surfaces 120 and 135 are co-planar. Tabs 112, specifically surfaces 135, retain an inner race (shown infra) for a stator (shown infra) into which plate 100 is installed. Surface 116 centers the inner race. Surfaces 118 center a bearing (shown infra) for the preceding stator.

In some aspects, plate 100 includes slots, which provide oil flow to the bearing and oil flow through the plate. Plate 100 is not limited to any particular number, shape, size, or configuration of slots. In some aspects, slots 136 are fully surrounded, or defined by, plate 100 and surface 120. In these cases, slots 136 are not limited to a particular width 138 or length 140. In some aspects, the slots 142 are in communication with surface 116. That is, the slots open into surface 116. Plate 10 is not limited to any particular number, shape, size, or configuration of slots 136 or 142. For example, slots 142 are not limited to a particular length 146, width 150, or radial angle with respect to longitudinal axis 154 of plate 100. Plate 100 can include any combination of slots 136 and 142. In some aspects (not shown), slots are in communication with an outer edge for plate 100.

In some aspects, slots 136 and 142 cross the respective planes formed by an inner or outer circumference for a bearing (not shown) engaged with plate 100, in particular, engaging surfaces 118 and 120. The planes are orthogonal to surface 120. Dashed lines 155 and 156 show possible intersections of the aforementioned planes with surface 120. In some aspects, slots 136 and 142 cross lines 155 or 156 at areas 157A and 157B, respectively. Due to these crossings, oil flowing through the slots is able to both lubricate the bearing and flow past the bearing. For example, at area 157B, a portion of slot 136 is between the inner and outer circumference of the bearing (enabling oil flow to the bearing) and a portion of slot 136 is outside line 156, with respect to center 117, (enabling oil flow past the bearing).

In some aspects, plate 100 also includes slots 158. These slots are configured to engage the stator (not shown), rotationally locking the plate and the stator. Plate 100 is not limited to any particular number, shape, size, or configuration of slots 158. For example, slots 158 are not limited to a particular length 159 or width 160. Slots 158 can be configured to accommodate the particular stator in which plate 100 is to be installed.

In some aspects, plate 100 is machined, cast, or molded. In some aspects, plate 100 is stamped. Plate 100 can be made of any material known in the art. For example, a stamped plate 100 can be made from steel or aluminum. In those aspects in which plate 100 is stamped, thickness 132 can be made smaller than for machined, cast, or molded plates. A reduction in thickness 132 advantageously reduces the axial space occupied by the stator containing plate 100.

Figure 9:
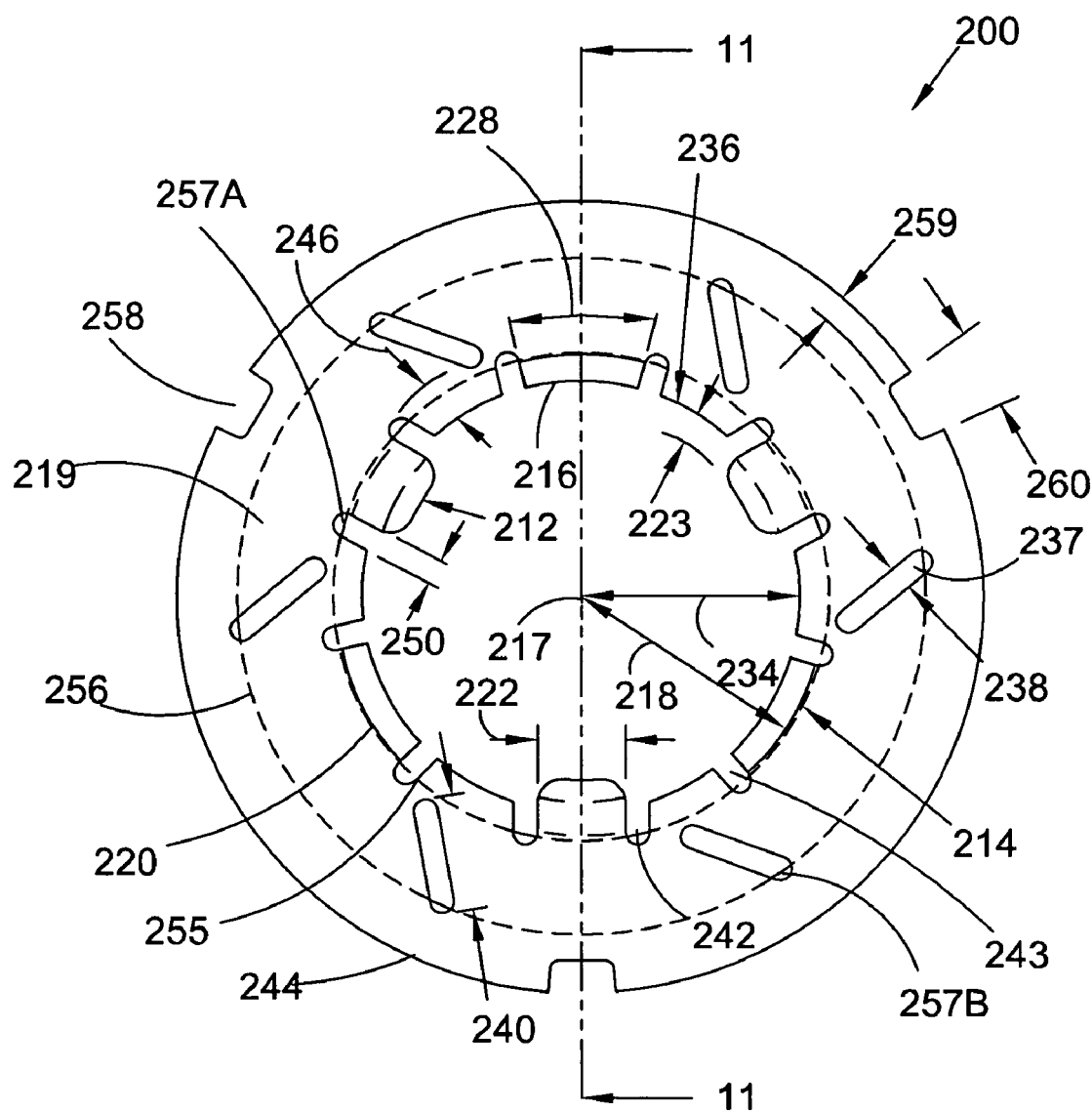
FIG. 9 is a top view of a third present invention side plate for a stator.

FIG. 9 is a top view of present invention stamped side plate 200 for a stator.

FIG. 10 is a bottom view of side plate 200 shown in FIG. 9.

FIG. 11 is a cross-sectional view of side plate 200 shown in FIG. 9 along line 11-11 in FIG. 9. The following should be viewed in light of FIGS. 9 through 11. Side plate 200 includes at least one protrusion 212, at least one annular protrusion 214, and an inner circumferential surface 216. Protrusions 212 extend radially inward beyond surface 216. In some aspects, protrusions 212 are in the form of tabs 212. Tabs 212 are used in the descriptions that follow, however, it should be understood that any type of protrusion, such as fingers, can be used for protrusions 212 and such protrusions are included in the spirit and scope of the invention as claimed.

By annular protrusion, we mean that protrusions 214 form at least a portion of a ring about center 217 for plate 200. Alternately stated, protrusions 214 are a uniform radial distance 218 from center 217. In some aspects, protrusions 214 are in the form of tabs 214. Tabs 214 are used in the descriptions that follow, however, it should be understood that any type of protrusion, such as fingers, can be used for protrusions 214 and such protrusions are included in the spirit and scope of the invention as claimed. Tabs 214 extend from top surface 219 of plate 200. In some aspects, centering surfaces 220 of tabs 214 are substantially orthogonal to surface 219.

It should be understood that plate 200 is not limited to the number, size, shape, and configuration of tabs 212 and 214 shown and that other numbers, sizes, shapes, and configurations of tabs 212 and 214 are included within the spirit and scope of the invention as claimed. For example, plate 200 can include more or less than 3 respective tabs 212 or 214. Regarding tabs 212, thickness 221, width 222, and dimension 223 can be selected according to the particular application in which plate 200 is installed. In like manner, for tabs 214, thickness 224, height 226, width 228, and radial dimension 218 can be selected according to the particular application in which plate 200 is installed. Plate 200 is not limited to a particular thickness 232 or radius 234. The thickness and radius can be selected according to the particular application in which plate 200 is installed. In general, the number of respective tabs and the dimensions of tabs 212 and 214 and surface 216 can be selected to provide the retaining and centering capability, described infra, required for a particular application, while accounting for the particular parameters, tolerances, and characteristics regarding the stator, inner race, bearing, and materials of construction associated with the application.

Tabs 212 include race retaining surfaces 235. In some aspects, surfaces 235 are substantially parallel to top surface 219. In FIGS. 9-11, surfaces 235 are non-coplanar with surface 219. In some aspects (not shown), surfaces 219 and 235 are co-planar. In some aspects, tabs 214 are proximate inner edge 236 or are formed at inner edge 236. For example, if plate 200 is stamped, tabs 214 can be formed from an inner circumference (not shown) of the stock material forming plate 200. Tabs 212, specifically surfaces 235 retain an inner race (shown infra) for a stator (shown infra) into which plate 200 is installed. Surface 216 centers the inner race. Tabs 214, specifically, surfaces 220, center a bearing (shown infra) for the preceding stator.

In some aspects, plate 200 includes slots, which provide oil flow to the bearing and oil flow through the plate. Plate 200 is not limited to any particular number, shape, size, or configuration of slots. In some aspects, slots 237 are fully surrounded, or defined by, plate 200 and surface 219. In these cases, slots 237 are not limited to a particular width 238 or length 240. In some aspects, the slots are in communication with surface 216 (slots 242 and 243). In some aspects (not shown), slots also are placed in communication with outer edge 244. Plate 200 is not limited to any particular number, shape, size, or configuration of slots 237 or 242. For example, slots 242 are not limited to a particular length 246 or width 250, or to a particular radial angle with respect to longitudinal axis 254 of plate 200. The discussion regarding the dimensions of slots 242 is applicable to slots 243. Plate 200 can include any combination of slots 237, 242 and 255.

In some aspects, slots 237 and 242 cross the respective planes formed by an inner or outer circumference for a bearing (not shown) engaged with plate 200, in particular, engaging surfaces 219 and 220. The planes are orthogonal to surface 219. Dashed lines 255 and 256 show possible intersections of the aforementioned planes with surface 219. In some aspects, slots 237 and 242 cross lines 255 or 256 at areas 257A and 257B, respectively. Due to these crossings, oil flowing through the slots is able to both lubricate the bearing and flow past the bearing. For example, at area 257B, a portion of slot 237 is between the inner and outer circumference of the bearing (enabling oil flow to the bearing) and a portion of slot 237 is outside line 256, with respect to center 217, (enabling oil flow past the bearing).

In some aspects, plate 200 also includes slots 258. These slots are configured to engage the stator (not shown), rotationally locking the plate and the stator. Plate 200 is not limited to any particular number, shape, size, or configuration of slots 258. For example, slots 258 are not limited to a particular length 259 or width 260. Slots 258 can be configured to accommodate the particular stator in which plate 200 is to be installed.

In some aspects, plate 200 is machined, cast, or molded. In some aspects, plate 200 is stamped. Plate 200 can be made of any material known in the art. For example, a stamped plate 200 can be made from steel or aluminum. In those aspects in which plate 200 is stamped, thickness 232 can be made smaller than for machined, cast, or molded plates. A reduction in thickness 232 advantageously reduces the axial space occupied by the stator containing plate 200.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A side plate for a torque converter stator, comprising:
   an annular segment having an inner circumferential surface, an outer edge, a longitudinal axis, and a top surface orthogonal to the longitudinal axis, and;
   at least two first protrusions extending from the top surface at the outer edge; and,
   at least two second protrusions, separate from the at least two first protrusions, extending radially inward beyond said inner circumferential surface, wherein the stator comprises an inner race and a bearing, wherein the at least two first protrusions are for centering the bearing, wherein said at least two second protrusions comprise respective race retaining surfaces, arranged to retain the inner race in the stator, and wherein said side plate is stamped.

2. The side plate of claim 1 wherein said race retaining surface is substantially parallel to said top surface.

3. The side plate of claim 2 wherein said race retaining surface is non-coplanar with said top surface.

4. The side plate of claim 1 wherein said inner circumferential surface is arranged to center said inner race.

5. The side plate of claim 1 wherein the at least two first protrusions include at least two annular protrusion extending from said top surface, and including respective centering surfaces substantially orthogonal to said top surface.

6. The side plate of claim 5 wherein said centering surfaces are arranged to center said bearing.

7. The side plate of claim 1 wherein said annular segment further comprises at least one slot.

8. The side plate of claim 7 wherein said at least one slot is fully surrounded by said annular segment.

9. The side plate of claim 7 wherein said at least one slot is in communication with a feature selected from the group consisting of said inner circumferential surface and said outer edge.

10. The side plate of claim 7 wherein said inner bearing includes an inner circumference and an outer circumference and said at least one slot crosses respective planes formed by a feature selected from the group consisting of said inner and outer circumferences for said bearing.

11. A side plate for a torque converter stator, comprising:
an annular segment having an inner circumferential surface and a top surface;
at least one protrusion extending radially inward beyond said inner circumferential surface, wherein said at least one protrusion comprises a race retaining surface substantially parallel to said top surface and said inner circumferential surface and said race retaining surface are arranged to center and retain, respectively, an inner race for said stator;
at least one annular protrusion, separate from said at least one protrusion, extending from said top surface, proximate an outer edge for said annular segment, and arranged to center a bearing for said stator; and,
at least one slot in said annular segment, wherein a bearing for said stator comprises an inner circumference and an outer circumference, and said at least one slot crosses a respective plane formed by a circumference selected from the group consisting of said inner and outer circumferences.

12. A method for engaging an inner race and a bearing for a stator in a torque converter, comprising:
stamping said plate to form at least one first, second, and third surfaces, respectively, and at least one slot;
retaining said inner race in said stator with said at least one first surface;
centering said inner race with said at least one second surface;
radially centering said bearing with said at least one third surface, wherein radially centering includes centering the bearing with respect to a center point for the plate; and,
providing oil flow through said side plate with said at least one slot, wherein said plate further comprises a top surface and wherein stamping said plate to form said at least one third surface further comprises forming an annular protrusion extending from said top surface and including a fourth surface substantially orthogonal to said top surface.

13. The method of claim 12 wherein said plate comprises an inner circumference and wherein stamping said plate to form said at least one first surface further comprises forming at least one first protrusion extending radially inward beyond said inner circumference.

14. The method of claim 12 wherein said plate further comprises an inner circumferential surface and wherein stamping said plate to form said at least one second surface further comprises forming said inner circumferential surface.

15. The method of claim 12 wherein said plate further comprises an outer edge and wherein stamping said plate to form said at least one third surface further comprises forming at least a portion of said outer edge.

16. The method of claim 12 wherein said plate further comprises an inner edge and wherein stamping said plate to form said at least one third surface further comprises forming at least a portion of said inner edge.

17. The method of claim 12 further comprising:
stamping said plate to form at least one second protrusion comprising said at least one first and third surfaces, respectively.

* * * * *